Figure 1:
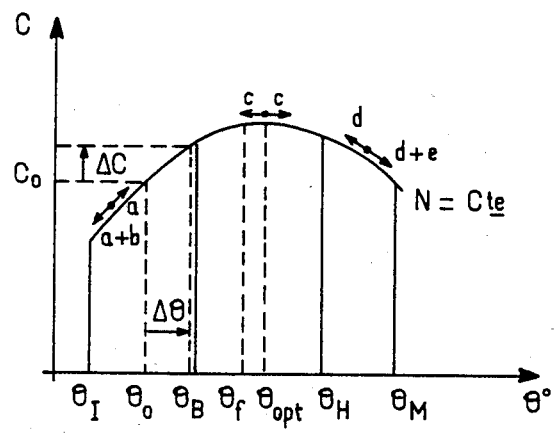

United States Patent [19]

Nguyen

[11] Patent Number: 4,586,473
[45] Date of Patent: May 6, 1986

[54] METHOD FOR THE SELF-ADAPTIVE CONTROL OF THE ANGLE OF IGNITION ADVANCE OF A THERMAL ENGINE HAVING POSITIVE IGNITION

[75] Inventor: Huu-Can Nguyen, Portet-sur-Garonne, France

[73] Assignee: Equipements Automobiles Marshall, Issy-les-Moulineaux, France

[21] Appl. No.: 601,621
[22] PCT Filed: Jul. 22, 1983
[86] PCT No.: PCT/FR83/00152
  § 371 Date: Mar. 27, 1984
  § 102(e) Date: Mar. 27, 1984
[87] PCT Pub. No.: WO84/00581
  PCT Pub. Date: Feb. 16, 1984

[30] Foreign Application Priority Data

Jul. 27, 1982 [FR] France .............................. 82 13095
Oct. 27, 1982 [FR] France .............................. 82 18017

[51] Int. Cl.⁴ ............................................. F02P 5/04
[52] U.S. Cl. ..................................... 123/419; 123/416
[58] Field of Search ....................... 123/419, 416, 417

[56] References Cited

U.S. PATENT DOCUMENTS 4,379,333 4/1983 Ninomiya et al. .............. 123/419 X
4,428,342 1/1984 Suzuki et al. ..................... 123/419
4,467,765 8/1984 Suzuki et al. ..................... 123/419

*Primary Examiner*—Tony M. Argenbright
*Attorney, Agent, or Firm*—Brisebois & Kruger

[57] ABSTRACT

In accordance with the invention, an iterative search operation for the optimum value $\theta_{opt}$ of the angle of advance is carried out by adding periodically an angle of advance increment $\Delta\theta$ to the instantaneous angle of advance $\theta_o$, and by detecting the instantaneous speeds $N_{1t}$ and $N_{2t}$ which correspond to the angles of advance $\theta_o$ and $\theta_o+\Delta\theta$, and by determining the direction of variation $\Delta N$ of the engine speed so as to correct the angle of advance $\theta_o$ such that the variation $\Delta N$ is as low as possible, or even zero, such that the angle of advance $\theta_o$ is kept in the vicinity of its optimum value $\theta_{opt}$. In the case of transitory states, a "floating cartography" is superposed and takes into account a curve of the advance as a function of the engine speed. The invention may be used for controlling the ignition advance of the engines of motor vehicles.

15 Claims, 10 Drawing Figures

METHOD FOR THE SELF-ADAPTIVE CONTROL OF THE ANGLE OF IGNITION ADVANCE OF A THERMAL ENGINE HAVING POSITIVE IGNITION

The present invention relates to a method for the self-adaptive control of the angle of ignition advance of a thermal engine having positive ignition, i.e. a method of control which does not relate to fixed laws of correspondence between the angle of advance and the operating parameters of the engine, such as the engine load or torque, its speed of rotation or the speed of the engine, its operating temperature, atmospheric pressure, the octane rating of the fuel etc., certain of which develop as a function of other parameters in accordance with predetermined families of curves or tables.

Conventional methods of control of the angle of advance which relate to these laws or tables of correspondence, which may be recorded and are called "angle of advance cartography" are used in both mechanical and electronic devices which comprise sensors for detecting certain parameters which only take into account these preferential parameters, for example the speed of rotation and the load of the engine, in order to deduce the angle of advance therefrom.

These known methods are therefore disadvantageous in that they do not in general take into account all the operating parameters of the engine, and do not therefore enable optimum control of the angle of advance, and may only be used with costly and complex devices which comprise numerous sensors.

The invention relates to a method for the self-adaptive control of the angle of advance, which counters the above-mentioned drawbacks, the application of which enables a constant setting of the angle of advance to its optimum value or to a value which is very close thereto, as a result of the fact that all the operating parameters of the engine are implicitly taken into account.

The invention also relates to a method which takes into account additionally, for the setting of the angle of advance, the manufacturing tolerances and variations of the components of any devices designed to carry out the method, as well as the ageing of the engine.

The invention relates further to a method designed to be carried out with a device which does not comprise the various sensors required for the known methods, and which does not comprise in particular sensors for the engine load, such that this device may be of a simpler and less costly construction, simply requiring a positional sensor (for example detecting a component embedded in the engine flywheel) acting as an angular reference for the crankshaft position, and a second sensor detecting the teeth of a ring gear connected to the drive shaft, for example the starting ring gear, and acting as an angular definition for the ignition advance, one or other of these two sensors acting as an engine speed sensor.

In the case of a method of this type for the self-adaptive control of the angle of ignition advance of a thermal engine with positive ignition, designed in particular for use with a motor vehicle, as described in the U.S. Pat. No. 3,142,967, an iterative search operation for the optimum value $O_{opt}$ of the angle of advance is carried out, this operation comprising:

the periodic addition of an angle of advance increment $\Delta\theta$ to an instantaneous angle of advance $\theta_o$, the detection of the instantaneous speeds N of the engine which correspond to the angles of advance $\theta_o$ and $\theta_o + \Delta\theta$, to determine the direction of speed variation $\Delta N$ of the engine, and to correct the angle of advance $\theta_o$ so that the speed variation $\Delta N$ is as low as possible, or even zero, such that the angle of advance $\theta_o$ is kept in the vicinity of its optimum value $\theta_{opt}$.

In accordance with the invention, in order that the periodic angle of advance increment $\Delta\theta$ is added to the instantaneous angle of advance $\theta_o$ synchronously with the engine speed, the detection of the instantaneous speeds of the engine N is carried out at the end of each half-period of the iterative operation, and the half-period is selected as a function of the speed N of the engine, such that the latter is well-established at the end of each half-period, taking into account the inertia of the engine and, when the latter is installed in a vehicle, also taking into account the transmissions, the wheels and the vehicle. In addition, in accordance with the invention, the direction of variation of the speed N of the engine is determined by comparing the speed $N_{1t}$ detected at the end of a half-period without an angle of advance increment $\Delta\theta$, during the measurement of rank t, with the speeds of $N_{2(t-1)}$ and $N_{2(t)}$ detected at the end of half-periods with angle of advance increments $\Delta\theta$ respectively during the previous measurement of rank $(t-1)$ and during the measurement of rank t.

In a preferred embodiment, the method of the invention additionally includes correcting the angle of advance $\theta_o$ by respectively adding thereto or subtracting therefrom a value $\epsilon\theta \leq \Delta\theta$ if the speed $N_{1t}$ is, for a number m of comparisons, preferably greater than 1 and lower than 10, and lower or greater than the speeds $N_{2(t-1)}$ and $N_{2t}$, so as to bring the instantaneous angle of advance $\theta_o$ progressively towards its optimum value $\theta_{opt}$, whereas no correction is carried out if the speeds $N_{1t}$, $N_{2t}$ and $N_{2(t-1)}$ are substantially equal.

When the speed $N_{1t}$ lies between the speeds $N_{2(t-1)}$ and $N_{2t}$, i.e. the slope of the speed of the engine masks the consequences of the speed variation $\Delta N$ due to the periodic addition of the angle of advance increment $\Delta\theta$ to the instantanteous angle of advance $\theta_o$, the control described is unable to operate, and, in accordance with a first variant of the method of the invention, the angle of advance is corrected by superposing a curve giving the angle of advance as a function of the speed of the motor on the above-described operation of the control, which enables the angle of advance to be corrected with respect to transitory states.

Consequently, the control in accordance with this first variant of the invention enables, in the case of operation during stabilised states and with an angle of advance $\theta_o$ close to the optimum angle of advance $\theta_{opt}$, differentiation between the effects of the periodic application of an angle of advance increment $\Delta\theta$ to the instantaneous angle of advance $\theta_o$ and the other operating parameters of the engine and the environmental factors relating to the vehicle provided with this engine. However, during operation in transitory states, during which the effects of the addition of $\Delta\theta$ are masked by considerable speed variations due to these other parameters relating to the operation of the engine or the vehicle environment, the control described above is combined with a supplementary control of the so-called "floating cartography" type, since the angle of advance is corrected by superposing a curve giving this angle of advance as a function of the engine speed, i.e. the corresponding angle of advance value given by this curve is added to the angle of advance $\theta_o$ or $\theta_o+\Delta\theta$ of the control for each value of the speed N of the engine.

In accordance with the first variant of the invention, the curve of the angle of advance as a function of the speed, which may be used as "floating cartography", is that obtained during normal operation of the engine, if the risk of pinging of the latter is slight. However, if there is a high risk of pinging, use is made of the curve obtained when the engine is fully loaded.

In a first advantageous form of this variant of the method of the invention, which only causes this "floating cartography" to come into operation in the case of high acceleration or deceleration, the speed $N_{2t}$ is compared at each instant with a stored speed $N_3$ which is either the speed $N_1$ measured just before $N_{1t}$ lies between the speeds $N_{2(t-1)}$ and $N_{2t}$, or the last of the speeds $N_2$ measured when the angle of advance is corrected by the superposition of the curve of this angle as a function of the engine speed, and a correction having a value $\pm k|N_3-N_{2t}|$ is applied to this angle of advance $\theta_o$ in accordance with the direction of variation of the speed, therefore in accordance with the sign of $N_3-N_{2t}$, and wherein k is the slope of the curve of the angle of advance as a function of the speed of the engine at the speed $N_{2t}$, if the speed variation $|N_3-N_{2t}|$ is greater than or equal to the value $\Delta N_o$ of the speed variation which corresponds to the smallest angular advance increment possible at the speed $N_{2t}$.

In a second advantageous form of the first variant of the method of the invention, which causes the continuous operation of the control by "floating cartography", except at moments during which a correction $\epsilon\theta$ is carried out, the speed $N_{2t}$ is compared at each instant with a stored speed $N_3$ which is either the last speed $N_1$ for which the angle of advance $\theta_o$ has been corrected by a value plus or minus $\epsilon\theta$, or the last speed $N_2$ for which the angle of advance $\theta_o$ has been corrected by superposition of the curve of this angle as a function of the engine speed, and a correction having a value $\pm k|N_3-N_{2t}|$ is applied to the angle of advance $\theta_o$ in accordance with the direction of variation, therefore in accordance with the sign of $N_3-N_{2t}$, and wherein k is again the slope of the curve of the angle of advance as a function of the engine speed at the speed $N_{2t}$, if the speed variation $N_3-N_{2t}$ is greater than or equal to the value $\Delta N_o$ of the speed variation which corresponds to the smallest angular advance increment possible at this speed $N_{2t}$.

Although the application of the method of the first variant described above gives good ressults with stabilised states and slightly and averagely variable transitory states, i.e.

(a) when the speed $N_{1t}$ is

1/ simultaneously lower than $N_{2t}$ and lower than or equal to $N_{2(t-1)}$, or 2/ simultaneously lower than or equal to $N_{2t}$ and lower than $N_{2(t-1)}$, which means that the instantaneous angle of advance $\theta_o$ is lower than its optimum value $\theta_{opt}$, or (b) when the speed $N_{1t}$ is 1/ simultaneously greater than $N_{2t}$ and greater than or equal to $N_{2(t-1)}$, or 2/ simultaneously greater than or equal to $N_{2t}$ and greater than $N_{2(t-1)}$, which means that the instantaneous angle of advance $\theta_o$ is greater than its optimum value $\theta_{opt}$, this is not always the case for widely variable transitory states, for which the speed $N_{1t}$ lies between the speeds $N_{2t}$ and $N_{2(t-1)}$, and the slope of the engine speed N masks all the results of the speed variations $\Delta N$ due to the periodic addition of the angle increment $\Delta\theta$ to the instantaneous angle of advance $\theta_o$, despite the correction of the angle of advance which is proposed in the first variant described above and which consists in superposing a curve giving the angle of advance as a function of the engine speed on the operation of the control described above.

A second variant of the method of the invention is designed to remedy the drawback of the first variant described above in the case of widely variable transitory states, during which the effects caused by the periodic application of an angle of advance increment $\Delta\theta$ to the instantaneous angle of advance $\theta_o$ are masked by considerable speed variations due to other operating parameters of the invention or environmental parameters of the vehicle, in contrast to that which takes place during stabilised states or slightly transitory states during which the effects of the addition of $\Delta\theta$ may be differentiated from the effects due to these other parameters relating to the engine operation or the environmental conditions of the vehicle provided with this engine.

However, this second variant is also designed to provide a control method whose application is satisfactory in the case of all engine states, such that it may be advantageouly substituted for the first variant described above.

For this purpose, the method of the second variant of the invention in which, in accordance with the first variant, an iterative search operation for the optimum value $\theta_{opt}$ of the angle of advance is carried out, this operation consisting in:

the periodic addition of an angle of advance increment $\Delta\theta$ to an instantaneous angle of advance $\theta_o$, the detection, at the end of each half-period of the iterative operation, of the instantaneous speeds $N_1$ and $N_2$ of the engine, which correspond respectively to the angles of advance $\theta_o$ and $\theta_o+\Delta\theta$, the half-period being selected as a function of the speed N of the engine, and in particular the detection of the speed $N_{1t}$ at the end of a half-period with no angle of advance increment $\Delta\theta$, during the measurement of rank t, and the speeds $N_{2(t-1)}$ and $N_{2t}$ at the end of half-periods with angle of advance increments $\Delta\theta$ respectively during the previous measurement or rank $(t-1)$ and during the measurement of rank t.

the correction of the angle of advance $\theta_o$ so that the speed variation $\Delta N$ which results therefrom is as small as possible, or even zero, such that the angle of advance $\theta_o$ is kept in the vicinity of its optimum value $\theta_{opt}$, is characterised in that the angle of advance $\theta_o$ is corrected by respectively subtracting therefrom or adding thereto a value $\epsilon\theta$, which is lower than or equal to $\Delta\theta$ if double the speed $N_{1t}$ is, for a number m of comparisons, preferably between 1 and 10, and respectively greater or lower than the sum of the speeds $N_{2(t-1)}$ and $N_{2t}$, so that the instantantaneous angle of advance $\theta_o$ may be moved towards its optimum value $\theta_{opt}$, whereas no correction is carried out if double the speed $N_{1t}$ is equal to he sum of the speeds $N_{2(t-1)}$ and $N_{2t}$.

However, in order to counter the response time, which may be relatively long in the case of a device for carrying out method of this type, it is advantageous, in accordance with a first preferred form of the second variant of the method of the invention, for the control described above to be linked, in a manner similar to that described in the first variant mentioned above, to a supplementary control of the so-called "floating cartography" type, in accordance with which the angle of advance is corrected by superposing a curve giving this angle of advance as a function of the engine speed, i.e. for each value of the speed N of the engine, the corresponding value of the angle of advance given by this curve is added to the angle of advance $\theta_o$ or $\theta_o+\Delta\theta$ of the control.

As is the case for the first variant, the curve of the angle of advance as a function of speed, which is used as "floating cartography", may be that obtained during normal operation of the engine, if there is only a slight risk of pinging of the engine. However, if there is a high risk of pinging, use is preferably made of the curve obtained when the engine is fully loaded.

In a second advantageous form of the second variant of the method of the invention, in which control by "floating cartography" is carried out continuously, except at moments when a correction of values $+\epsilon\theta$ is being carried out, the speed $N_{2t}$ is compared at each instant with a stored speed $N_3$ which is the last speed $N_2$ for which the angle of advance $\theta_o$ has been corrected by superposition of the curve of this angle as a function of the speed of the engine, and a correction $\pm k|N_3-N_{2t}|$ is applied to the angle of advance $\theta_o$ in accordance with the direction of variation, therefore in accordance with the sign of $N_3-N_{2t}$, wherein k is the slope of the curve of the angle of advance as a function of the engine speed, at the speed $N_{2t}$, if the speed variation $N_3-N_{2t}$ is greater than or equal to the value $\Delta N_o$ of the speed variation which corresponds to the smallest angualr advance increment possible at this speed $N_{2t}$.

In a further advantageous form of the second variant, $N_{2t}$ is compared with a stored speed $N_3$ which is the last speed $N_2$ for which the angle of advance $\theta_o$ has been corrected by a value $\pm\epsilon\theta$, the remainder of the method taking place in the way described in the previous paragraph.

The correction of the present invention of the angle of advance $\theta_o$ by the addition of a value $\pm\epsilon\theta$ is preferably predominant with respect to the correction which consists in adding a value $\pm k|N_3-N_{2t}|$, as a result of the sufficiently high value given to the speed variation $\Delta N_o$, corresponding to the smallest angular resolution of the advance.

As the iterative search operation for the optimum value $\theta_{opt}$ of the angle of advance may bring the latter into the zone in which pinging of the engine takes place, in particular when the engine is operating at full load and low speed, it is advantageous for the invention to comprise a pinging control stage.

For this purpose, the method of the invention comprises the following additional steps:

the detection of the vibrations due to the pinging of the engine, the comparison of the signal level detected with a a weighted mean of the signal levels detected during the previous ignitions of the engine, the reduction of the angle of advance by a certain value each time that pinging is detected, in order to suppress the latter and the progressive return of the angle of advance to its initial value when the pinging has stopped.

However if it is desired to cut costs and dispense with a pinging control of this type, the method is characterised in that it consists in the following steps:

the progressive return of the instantaneous angle of advance $\theta_o$ from a fictitious optimum value $\theta_f$ which is lower than $\theta_{opt}$ and shifted with respect to the value $\theta_{opt}$ outside of the zone in which pinging takes place, by comparing $2N_{1t}+\delta$ to $N_{2t}+N_{2(t-1)}$, wherein $\delta$ is a term of correction corresponding to the shift between $\theta_{opt}$ and $\theta_f$, and the increase or reduction of $\theta_o$ by the value $\epsilon\theta$ if $2N_{1t}+\delta$ is respectively lower or greater than $N_{2t}+N_{2(t-1)}$, whereas if $2N_{1t}+\delta=N_{2t}+N_{2(t-1)}$, no correction is made as $\theta_o=\theta_f$.

If it is desired to speed up the response time of the control in one direction of variation of the angle of advance, for example in the direction of the value $\theta_{opt}$, the invention advantageously proposes to modulate the value of the number m of sucessive confirmations of the checking of one of the inequalities, which controls correction by the addition or subtraction of $\epsilon\theta$, as a function of the direction of variation of the instantaneous angle of advance $\theta_o$.

A modulation of the number m is also possible as a function of the angular ranges in which the angle of advance is located with respect to the limit angular values of the angle of advance $\theta_o$, such as the initial value $\theta_I$, the maximum limit value $\theta_M$ and the top and bottom limit values $\theta_B$ and $\theta_H$ between which the value $\theta_{opt}$ is located.

For the same purpose it is possible in accordance with the invention, to assume that the inequality which controls the correction by addition or subtraction of $\epsilon\theta$ to the the angle of advance $\theta_o$ in order to vary it in this direction, is confirmed even if there is equality, whereas it is necessary for the inequality to be respected m times consecutively in the other direction of variation of the angle of advance $\theta_o$.

Figure 2:
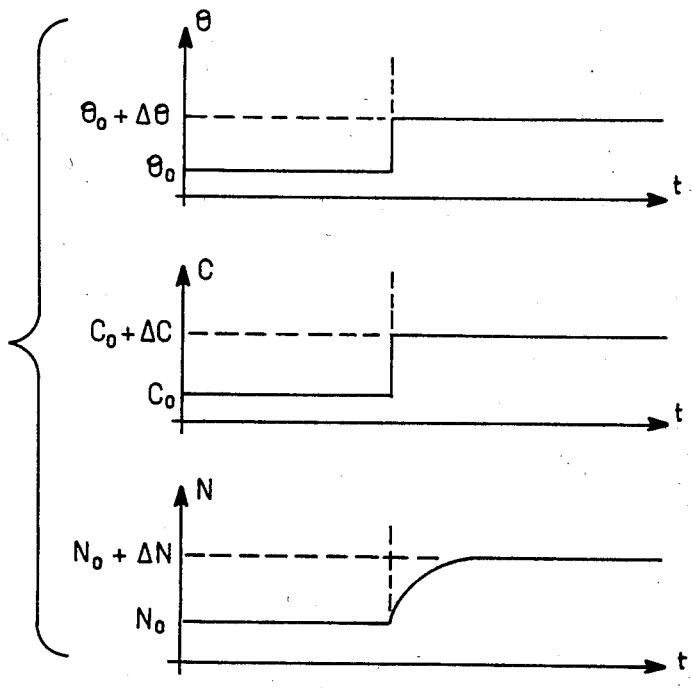
Figure 3:
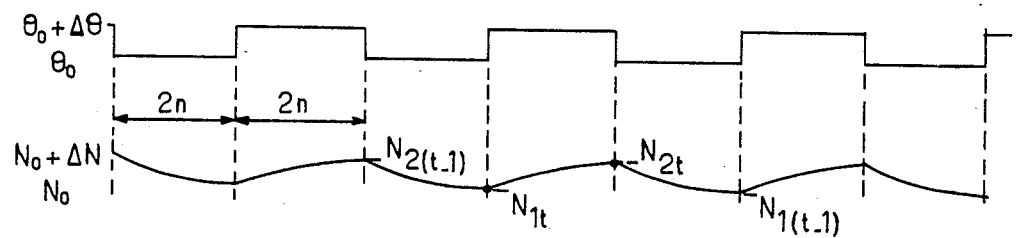
Figure 4:
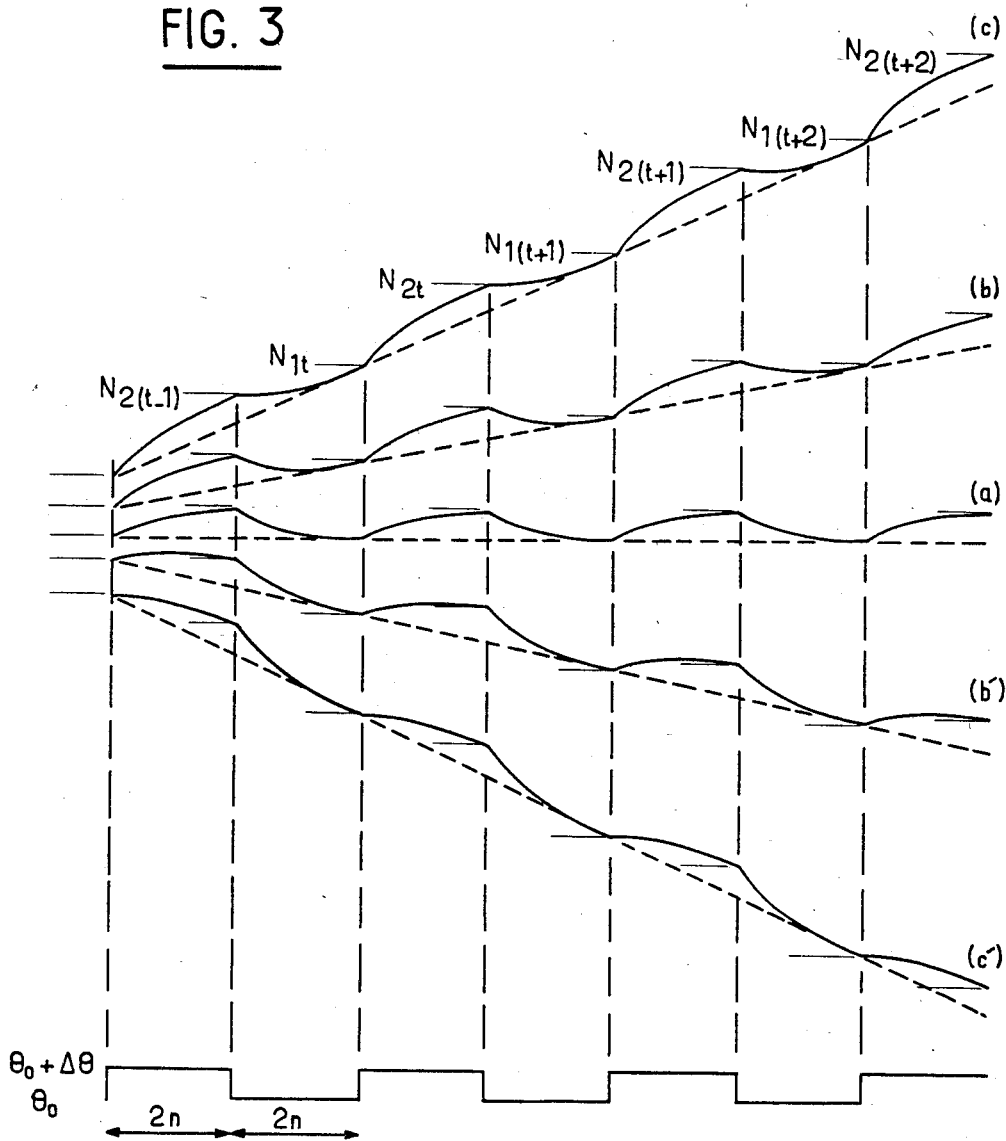
Figure 5:
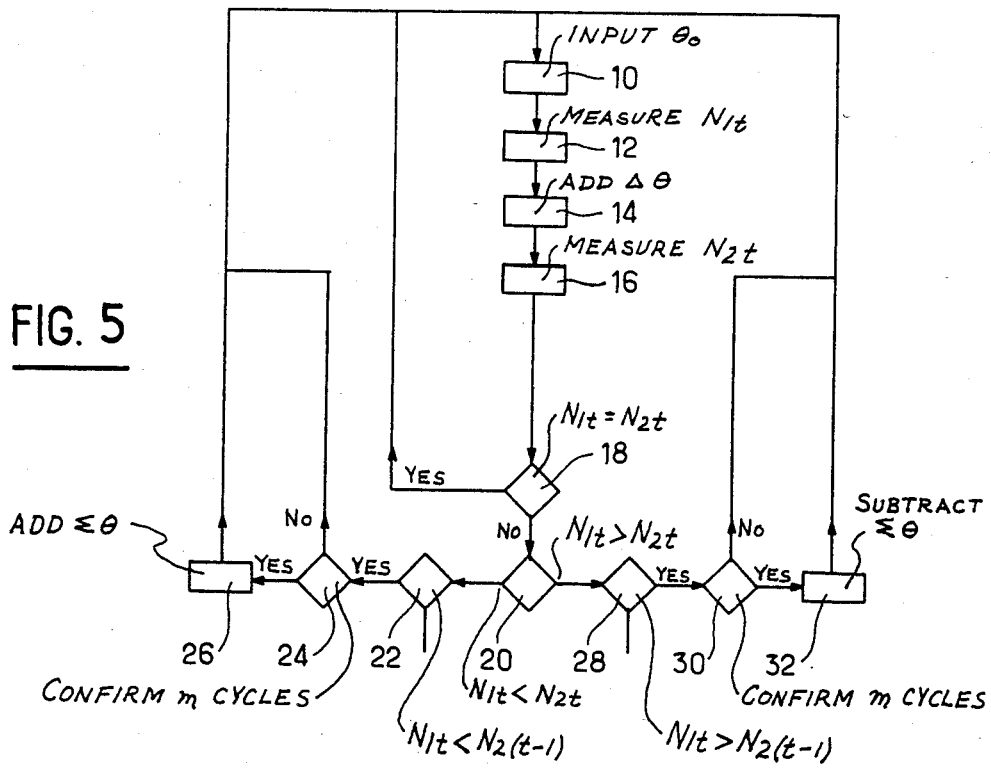
Figure 6:
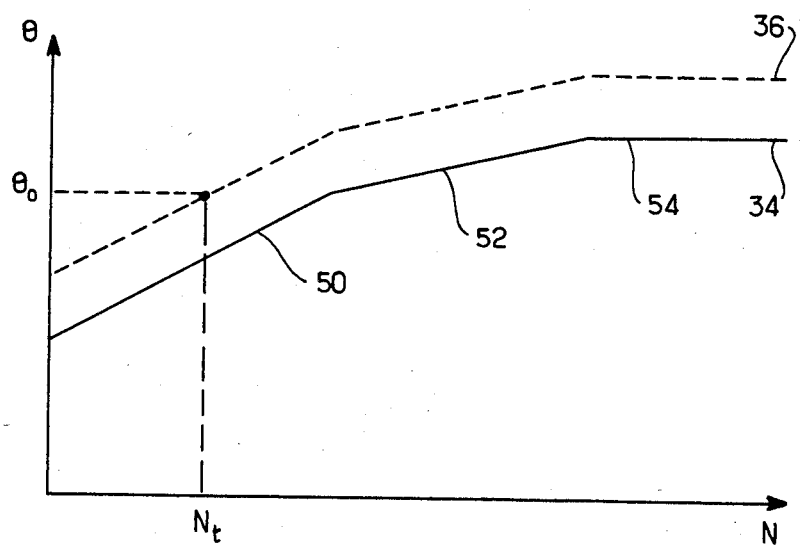
Figure 7:
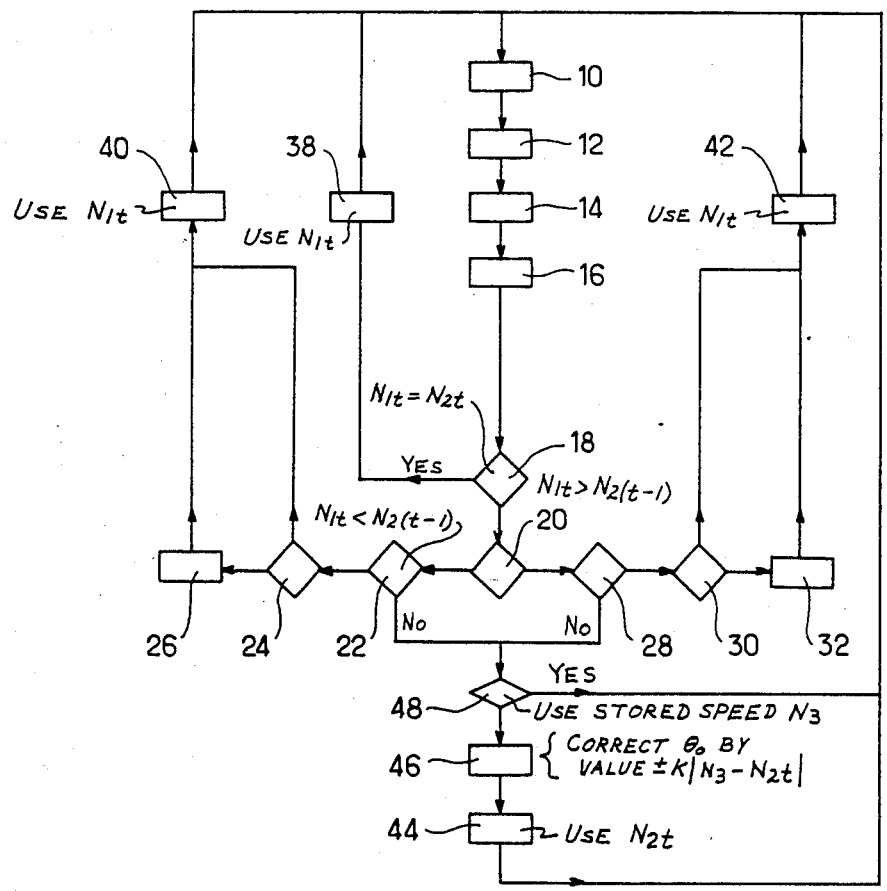
Figure 8:
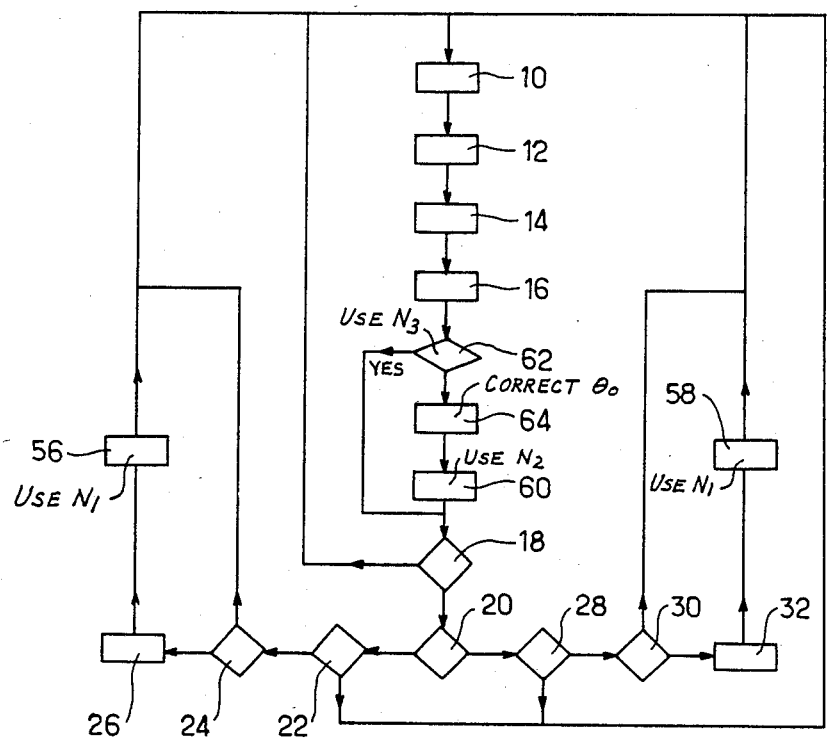
Figure 9:
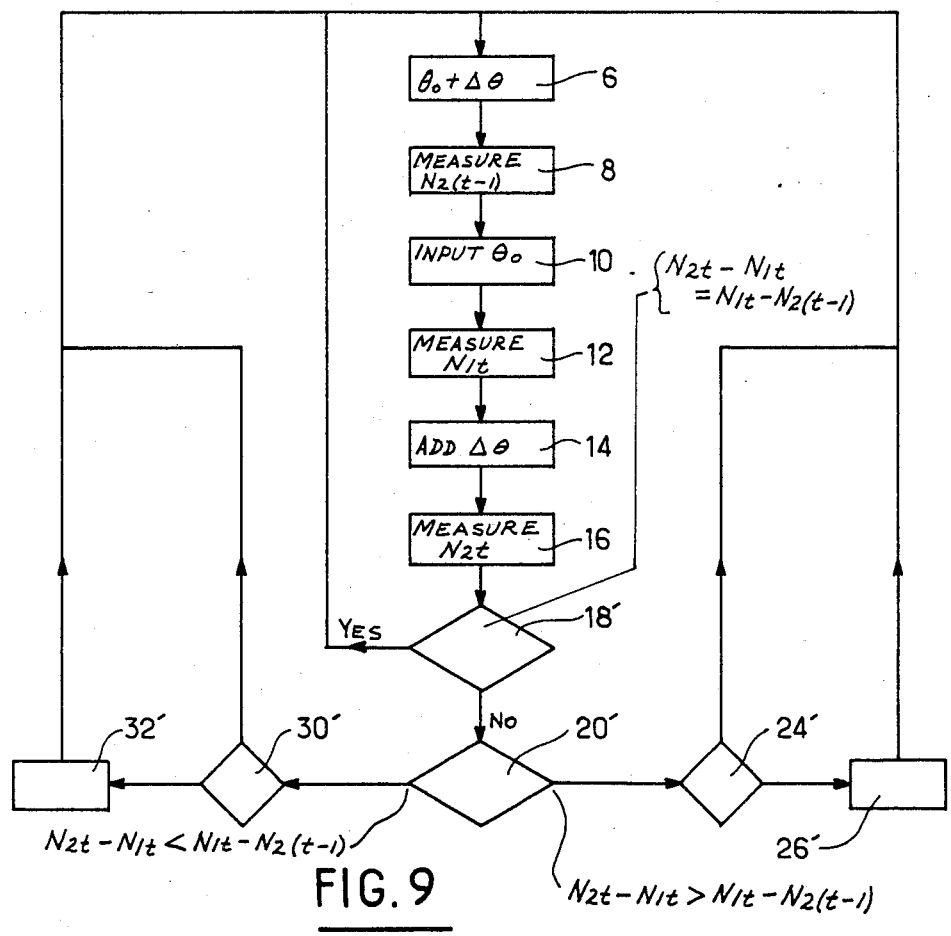
Figure 10:
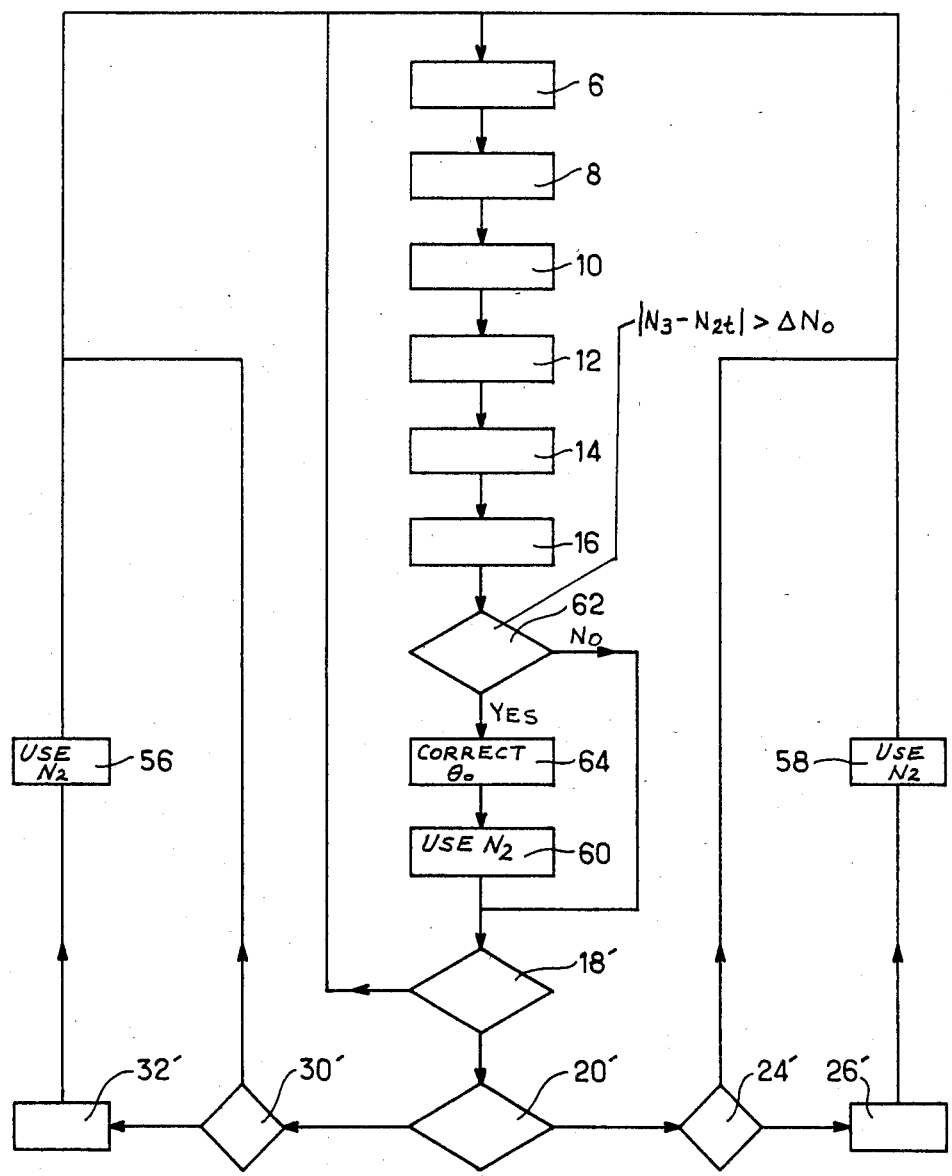

The invention is now described in detail, by way of non-limiting example, with respect to two embodiments illustrated in the attached drawings, in which:

FIG. 1 is a curve showing the variation of the engine torque as a function of the angle of advance, for a constant engine speed, FIG. 2 shows the corresponding variations of the angle of advance, the engine torque and the engine speed given as a function of time and caused by an angle of advance increment $\Delta\theta$, FIG. 3 is a curve showing the variations of the engine speed corresponding to the periodic addition of an angle of advance increment $\Delta\theta$ to the instantaneous angles of advance $\theta_o$, FIG. 4 shows curves similar to those of FIG. 3 for stabilised states and transitory states, FIG. 5 is a flow chart corresponding to a first embodiment of the method of the invention, without the application of "floating cartography", FIG. 6 shows a curve of the angle of advance as a function of the speed N of the engine, which is used as "floating cartography" and superposed on the method for which the flow-chart of FIG. 5 is given, FIG. 7 is a flow chart of a second embodiment of the method of the invention, in which the "floating cartography" only comes into operation during high accelerations or decelerations, FIG. 8 is a flow chart of a third embodiment of the method of the invention, in which the "floating cartography" operates in a continuous manner except when the angle of advance is subject to a correction having a value $\pm\epsilon\theta$, FIG. 9 is a flow chart corresponding to a fourth embodiment of the method of the invention, without the use of "floating cartography", and FIG. 10 is a flow chart of a fifth embodiment of the method of the invention, in which the "floating cartography" operates in a continuous manner, except when the angle of advance is subject to corrections having a value $\pm\epsilon\theta$.

For a given point of operation of the engine, i.e. for a specific speed and load, it is known that the curve of variation of the engine torque C as a function of the angle of ignition advance $\theta$ is a bell curve whose concavity faces downwards, and whose course is shown in FIG. 1. It can be seen that there is a value $\theta_{opt}$ of the angle of advance for which the torque C is at maximum level. For a given power this specific value $\theta_{opt}$ also corresponds to the lowest fuel consumption by the engine. When the instantaneous value $\theta_o$ of the angle of advance of the engine is relatively remote from the optimum value $\theta_{opt}$, any variation $\Delta\theta$ of the angle of advance causes a corresponding variation $\Delta C$ of the engine torque, as shown in FIG. 1. This direction of variation $\Delta C$ of the torque with respect to the direction of variation $\Delta\theta$ of the angle of advance is determined by the relatine position of the instantaneous angle of advance $\theta_o$ with respect to the optimum value $\theta_{opt}$. If the addition of an advance increment $\Delta\theta$ to the instantaneous advance $\theta_o$ causes the almost simultaneous addition of a torque increment $\Delta C$ to the instantaneous torque $C_o$, as shown in FIG. 2, this is not the case with respect to the speed variations of the engine. It is known that the torque variation $\Delta C$ causes a speed variation $\Delta N$ with a certain delay which is due to the inertia resulting from the assembly constituted by the engine, the transmissions, the gears and the vehicle provided with this engine. The direction of variation is the same for the torque and the speed, and FIG. 2 shows the almost simultaneous variations of the engine torque and the delayed variations of the speed which are caused by the application of an advance increment $\Delta\theta$ to an initial angle of advance $\theta_o$ which is lower than the optimum value $\theta_{opt}$, and such that $\theta_o+\Delta\theta$ is also lower than this value $\theta_{opt}$, since the increases of the angle of advance correspond to the increases of the engine torque and the engine speed.

FIG. 3 shows, with the same conditions of relative positioning of the instantaneous advance $\theta_o$ with respect to the optimum advance $\theta_{opt}$, the development of the engine speed N from a minimum value $N_o$, measured when the angle of advance is $\theta_o$, and a maximum value $N_o+\Delta N$, corresponding to a an angle of advance $\theta_o+\Delta\theta$, when the advance increment $\Delta\theta$ is periodically added to the instantaneous value $\theta_o$. By carrying out an iterative search which consists in periodioally adding to the instantaneous advance $\theta_o$ a supplementary advance increment $\Delta\theta$ and by comparing the differences between the successive speed resulting therefrom, i.e. by determining the direction of variation of the speed $\Delta N$, it is possible to correct the advance $\theta_o$ and keep the latter in the vicinity of its optimum value $\theta_{opt}$, for which practically no speed variation $\Delta N$ may be detected, so as to provide a regulation of the angle of advance.

The method of the invention consists in adding a periodic advance increment $\Delta\theta$ to the instantaneous angle of advance $\theta_o$ in synchronism with the speed of the engine. The half-period of this iterative operation may be selected to be equal to an even number of ignitions 2n, for example, wherein n equals 1, 2, 3 or 4 etc., which number is preferably selected as a function of the speed of the engine so that the frequency of the iterative search operation for the optimum value of the angle of advance is kept within a range of values which are compatible with the level of the speed variation signal $\Delta N$ to be detected and the response time of the whole of the assembly to which this process is applied. The number of ignitions may be, for example, four, six or eight, in accordance with the speed of the engine, in order to operate at a frequency of the iterative search operation which lies between 5 and 10 Hz. In addition, the value of the angle of advance increments $\Delta\theta$ may be selected to be equal to a multiple of the resolution of the angle of advance $\Delta\theta_o=360/2D$, wherein D is the number of teeth of the ring gear connected to the engine shaft and designed for the angular definition of the ignition advance, wherein this multiple may vary in accordance with the engine speed. In the case in which the angular definition is obtained with a gear having 129 teeth, $\Delta\theta_o=1°,4$ and the increment $\Delta\theta$ may be 1°,4, 2°8, 4°2, 5°6 or 7° in accordance with the speed of the motor. The consequences of the iterative search operation resulting from the addition of the increment $\Delta\theta$ are deduced from the measurements of the instantaneous speed of the engine at the end of each half-period. As shown in FIG. 3, the subscript 1 has been allocated to the speed measurements carried out at the end of the half-periods without the addition of the increment $\Delta\theta$ and the subscript 2 has been allocated to the speed measurements carried out at the end of the half-periods during which the increment $\Delta\theta$ was added. The chronological order or rank of the speed measurements is given by a second subscript t such that the successive speed measurements are as follows: $N_{1t}$, $N_{2t}$, $N_{1(t+1)}$, $N_{2(t+1)}$, etc.

In a first variant, the comparison of the successive speed measurements enables differentiation between four main configurations, shown by the curves of FIG. 4. If the comparison of the speed $N_{1t}$ with the previous $N_{2(t-1)}$ and subsequent $N_{2t}$ speeds shows that $N_{1t}$ is simultaneously lower than $N_{2(t-1)}$ and $N_{2t}$, it can be concluded that the speed variation $\Delta N$ is the result of the test consisting in adding an angle of advance increment $\Delta\theta$ to the instantaneous angle of advance $\theta_o$, in accordance with the iterative search operation for the optimum value of the angle of advance, and the speed variation takes place in the same direction as the variation of the angle of advance $\Delta\theta$, which means that, with respect to the curve of FIG. 1, the instantaneous advance $\theta_o$ is located to the left of the optimum value $\theta_{opt}$. This case corresponds either to stabilised operating speeds of the engine, i.e. such that the engine rotates at constant speeds N for advances $\theta_o$ and $\theta_o+\Delta\theta$ respectively, as shown by curve (a) of FIG. 4, or to transitory operating speeds of the engine, i.e. such that the engine has different speeds of rotation for a same advance $\theta_o$ or $\theta_o+\Delta\theta$, and simultaneously such that the slope of the speed variation is not sufficient to mask the variations $\Delta N$ which result from the test of the addition of $\Delta\theta$ to the instantaneous advance $\theta_o$, as shown in curves (b) and (b') of FIG. 4.

In this case, the search for the optimum value $\theta_{opt}$ of the advance consists in adding a value $\epsilon\theta$ which is lower than or equal to the increment $\Delta\theta$ to the instantaneous advance $\theta_o$, such that the advance is gradually moved towards the optimum value $\theta_{opt}$.

In a second case, the comparison of the speed $N_{1t}$ with the speeds $N_{2(t-1)}$ and $N_{2t}$ shows that the speed $N_{1t}$ is simultaneously greater than the speeds $N_{2t}$ and $N_{2(t-1)}$. In this case as well the variation of the speed $\Delta N$ is the consequence of the application of the increment $\Delta\theta$, although in this case $\Delta N$ has the opposite direction to $\Delta\theta$, i.e. the instantaneous advance $\theta_o$ is on the right of the optimum value $\theta_{opt}$ in FIG. 1. The control method consists in this case in subtracting a value $\epsilon\theta$ which is lower than or equal to the increment $\Delta\theta$ from the instantaneous advance $\theta_o$, such that the advance $\theta_o$ is gradually moved towards its optimum value $\theta_{opt}$.

In a third case, the speeds $N_{1t}$, $N_{2(t-1)}$ and $N_{2t}$ are found to be equal, which corresponds to operation at a stabilised speed and with an advance close to the optimum value $\theta_{opt}$. In this case, no correction needs therefore to be carried out on the angle of advance $\theta_o$.

In the three cases described above, the control method enables differentiation between the results of the application of the test $\Delta\theta$ and the results which may be due to other operating parameters of the engine.

The selective correction control which is applied in the three cases described above is illustrated by the flow-chart of FIG. 5.

Following the input at 10 of the advance $\theta_o$, the speed $N_{1t}$ at the end of the corresponding half-period is measured at 12, the increment $\Delta\theta$ is added to the advance $\theta_o$ at 14, and the speed $N_{2t}$ at the end of the corresponding half-period is measured at 16. The speeds $N_{1t}$ and $N_{2t}$ are compared at 18 and, if equal, the cycle described above is repeated with no correction of $\theta_o$, as the advance is close to its optimum value $\theta_{opt}$.

In the case of inequality, a test is carried out at 20 to ascertain whether the speed $N_{1t}$ is lower than the speed $N_{2t}$. If this is the case, a test is carried out at 22 to ascertain whether the speed $N_{1t}$ is also lower than the speed $N_{2(t-1)}$. If this is the case and has been confirmed on a number m of successive occasions at 24, which may vary between 1 and 10, in accordance with the speed and the type of the engine or vehicle, wherein the value m=3 may represent a suitable compromise, a correction is carried out at 26 which involves adding to the advance $\theta_o$ a value $+\epsilon\theta$ which may be equal to a multiple of $\Delta\theta_o$, for example 1°4, 2°8, 4°2, 5°6, or 7° in accordance with the value selected for the increment $\Delta\theta$. The following cycle is then carried out with the new value of $\theta_o$ determined in this way. The following cycle is also undertaken if the condition in accordance with which the speed $N_{1t}$ is simultaneously lower than $N_{2t}$ and $N_{2(t-1)}$ is not confirmed m consecutive times at 24.

If it is detected at 20 that the speed $N_{1t}$ is greater than $N_{2t}$, a check is carried out at 28 to ascertain whether $N_{1t}$ is also greater than $N_{2(t-1)}$. If it is detected at 30 that this has been the case m times, a correction is carried out at 32 which involves subtracting the value $\epsilon\theta$ from the advance $\theta_o$, the following cycle then taking place with the value of $\theta_o$ determined in this way. The following cycle is also undertaken if the condition in accordance with which $N_{1t}$ is simultaneously greater than $N_{2t}$ and $N_{2(t-1)}$ is not confirmed m times at 30.

Finally, if the speed $N_{1t}$ lies between the speeds $N_{2t}$ and $N_{2(t-1)}$, whilst being greater or lower than $N_{2t}$, a fourth case occurs, shown by the curves (c) and (c') in FIG. 4, for which the slope of the speed masks the effect of the speed variation $\Delta N$ due to the application of the test $\Delta\theta$. This corresponds to the case in which fairly considerable variations of the engine speed are due to parameters other than the application of the test $\Delta\theta$. These other parameters are either connected with the engine, such as for example the operation by the driver of the carburetor throttle, or associated with the environment of the engine and the vehicle, for example the effect of wind on the vehicle or the grade of the road, etc.

As the differentiation of the results of the application of the test $\Delta\theta$ is not then possible, the method of control by the iterative operation involving the periodic addition of the increment $\Delta\theta$ to an instantaneous value of the advance $\theta_o$ must be supplemented in order to enable a correction of the advance during the corresponding transitory states. This is carried out by the superposition of a "floating cartography" of the angle of advance as described below. This "floating cartography" is provided by a curve of the angle of advance $\theta$ as a function of the engine speed N.

As the engine must also be protected against the appearance of pinging, use is made of the curve of the angle of advance as a function of the engine speed which is obtained during use, if there is a low risk of pinging, or the curve of advance at full load if there is a high risk of pinging. This advance curve is superposed on the operation of the control by periodic addition of the test $\Delta\theta$ and therefore floats at each moment of a measurement of rank t of the speed N of the engine with the point corresponding to the instantaneous angle of advance $\theta_o$, via a translation following the axis of the angles of advance, as shown in FIG. 6, in which the curve 34 represents the basic advance and the curve 36 the floating advance at the moment of the measurement of rank t in question.

In a first particular mode, the control method only utilises the "floating cartography" in the case of high accelerations and decelerations. In this mode, whose flow chart shown in FIG. 7 directly supplements the flow chart of FIG. 5, the speed $N_{2t}$ is compared at each instant with a stored speed $N_3$, which represents either the last speed $N_1$ measured just before the speed $N_{1t}$ lies between the speeds $N_{2t}$ and $N_{2(t-1)}$, i.e. just before the detection of an acceleration or deceleration which is high enough to mask the speed variation $\Delta N$ due to the test $\Delta\theta$, or the last speed $N_2$ if a transitory state is already present and the advance is corrected in accordance with the "floating cartography" curve.

The substitution of the speed $N_{1t}$ for the stored speed $N_3$ takes place at 38, 40 and 42, in accordance with the case, and the substitution of the speed $N_{2t}$ for the stored speed $N_3$ takes place at 44, after correction at 46 of the instantaneous angle of advance $\theta_o$ by a value $\pm k|N_3-N_{2t}|$, in accordance with the direction of variation of the speed, which is provided by the sign of $N_3-N_{2t}$ and wherein k is the slope of the curve of the angle of advance as a function of the speed of the "floating cartography", at the speed $N_{2t}$, if the speed variation $|N_3-N_{2t}|$ is detected at 48 as being greater than a speed variation value $\Delta N_o$ which represents, at this speed $N_{2t}$, the speed variation corresponding to the smallest possible angular increment of advance.

As shown in FIG. 6, the curve of the angle $\theta$ as a function of the speed N, may be divided into three portions 50, 52, 54 for which the slope k assumes different values.

In the case of engines with positive ignition, the smallest possible angular increment of advance generally corresponds to half a tooth of the ring starter gear of the engine, when the latter is used for the angular definition.

In this particular mode, as long as no acceleration or deceleration is detected, the control operates in accordance with the flow chart of FIG. 5, and during a transitory acceleration or deceleration state, the angle of advance varies as a function of the floating curve of FIG. 6, so as provide an anticipation of the advance correction to be carried out, which enables a suitable response time for the control to be maintained. However, this variant has the drawback that the device for carrying out the method must comprise at least one very sensitive detector for the speed variation, in order to prevent the correction of the angle of advance from taking place with a delay which is too great.

In order to prevent the sensitivity threshold and the response time from having a detrimental effect on the application of the control method in accordance with this first variant, it is possible to utilise the "floating cartography" in accordance with a second particular mode of the method, whose flow chart is shown in FIG. 8.

In this variant, the speed $N_{2t}$ (measured at 16 after the addition at 14 of the increment $\Delta\theta$ following the measurement at 12 of the speed $N_{1t}$ obtained for an instantaneous advance $\theta_o$ processed at 10) is also compared with a stored speed $N_3$, which is either the last speed $N_1$ for which the angle of advance has been corrected by a value $\pm\epsilon\theta$, at 26 or at 32, as explained with reference to FIG. 5, and which is substituted for $N_3$ at 56 or 58, or the last speed $N_2$ which is substituted for $N_3$ at 60 and for which, as in the case of the previous variant, the angle of advance has been corrected as a function of the floating advance curve.

As in the case of the first particular mode, if the speed variation $|N_3 - N_{2t}|$, which is in this case processed at 62, after the measurement of the speed $N_{2t}$ at 16, is greater than the speed variation $\Delta N_o$ which corresponds, for this speed $N_{2t}$, to the smallest angular resolution of the advance, whose value is for example 1°4, the angle of advance is corrected at 64 by the value $\pm k|N_3 - N_{2t}|$, in accordance with the sign of $N_3 - N_{2t}$, which corresponds to the direction of variation of the speed, so that the advance is modified and takes into account the curve of the "floating cartography". The latter is therefore utilised for all the engine states, except when the angle of advance is corrected by a value $\pm\epsilon\theta$.

In a second variant, after the measurement of the speeds $N_{2(t-1)}$, $N_{1t}$ and $N_{2t}$, the comparison of the successive speed measurements does not involve the direct comparison of the speed $N_{1t}$ successively with the speeds $N_{2t}$ and $N_{2(t-1)}$, as is the case in the first variant described above, but rather the comparison of the difference between the speeds $N_{2t}$ and $N_{1t}$ with the difference between the speeds $N_{1t}$ and $N_{2(t-1)}$.

Three configurations may be distinguished from this comparison of speed differences.

In a first configuration, if $N_{2t} - N_{1t}$ equals $N_{1t} - N_{2(t-1)}$, it can be seen that the instantaneous angle of advance $\theta_o$ is equal to its optimum value $\theta_{opt}$, and that no correction needs therefore to be made.

In a second configuration, if $N_{2t} - N_{1t}$ is greater than $N_{1t} - N_{2(t-1)}$, it can be seen that the instantaneous angle of advance $\theta_o$ is lower than its optimum value $\theta_{opt}$. In this second case, the search for the optimum value $\theta_{opt}$ of the advance involves adding a value $\epsilon\theta$ which is lower than or equal to the increment $\Delta\theta$ to the instantaneous advance $\theta_o$, such that the advance is gradually brought to its value $\theta_{opt}$.

In a third configuration, if $N_{2t} - N_{1t}$ is lower than $N_{1t} - N_{2(t-1)}$, it can be seen that the instantaneous angle of advance is greater than its optimum value $\theta_{opt}$. In this last case, the search for the optimum value $\theta_{opt}$ of the angle of advance involves decreasing this angle of advance $\theta_o$ by a value $\epsilon\theta$ which is lower than or equal to the increment $\Delta\theta$, so that the angle $\theta_o$ may be gradually brought to its optimum value $\theta_{opt}$ in this case as well.

The selective correction control which is applied in the three cases described above, and which is in theory valid for all the engine states, including the highly transitory state, is described with reference to the flow chart of FIG. 9.

The instantaneous angle of advance $\theta_o$ is applied at 10, following the measurement of 8 of the speed $N_{2(t-1)}$, which itself follows the application at 6 of the value $\theta_o + \Delta\theta$. The speed $N_{1t}$ is then measured at 12, at the end of the corresponding half-period, and the value $\theta_o + \Delta\theta$ is then applied again at 14. At the end of the corresponding half-period, the speed $N_{2t}$ is measured at 16 and the speed difference $N_{2t} - N_{1t}$ is compared at 18' with the speed difference $N_{1t} - N_{2(t-1)}$, or, which amounts the same thing, $2N_{1t}$ is compared with the sum $N_{2t} + N_{2(t-1)}$ and, in the case of equality, the cycle described above is repeated with no correction of $\theta_o$ as the advance is equal to the optimum value $\theta_{opt}$ or close to the latter.

In the case of inequality, a test is carried out at 20' to ascertain whether the difference $N_{2t} - N_{1t}$ is lower than the difference $N_{1t} - N_{2(t-1)}$, or whether $2N_{1t}$ is greater than $N_{2t} + N_{2(t-1)}$. If this inequality is confirmed and is confirmed m consecutive times at 30', which may vary between 1 and 10, in accordance with the speed and the type of the engine or vehicle, wherein the value m=3 appears to be a suitable compromise, a correction which involves subtracting a value $\epsilon\theta$ from the advance $\theta_o$ is carried out, and the following cycle takes place with the new value of $\theta_o$ determined in this way. The value $\epsilon\theta$ may be equal to a multiple of the resolution $\Delta\theta_o$ of the angle of advance, for example, 1°4, 2°8, 4°2, 5°6 or 7° in accordance with the value selected for the increment $\Delta\theta$. It should be noted that the following cycle also takes place if the condition in accordance with which $2N_{1t}$ is greater than $N_{2t} + N_{2(t-1)}$ is not confirmed m consecutive times at 30', although this following cycle is carried out with a non-modified value $\theta_o$.

If it is detected at 20' that the difference $N_{2t} - N_{1t}$ is greater than the difference $N_{1t} - N_{2(t-1)}$ or if $2N_{1t}$ is lower than than $N_{2t} + N_{2(t-1)}$, and if this has been the case m times at 24', a correction which involves adding the value $\epsilon\theta$ to the advance $\theta_o$ is carried out at 26', and the following cycle takes place with the new value of $\theta_o$ determined in this way. The following cycle is also carried out, but with a non-modified value of $\theta_o$, if the condition in accordance with which $2N_{1t}$ is lower than $N_{2t} + N_{2(t-1)}$ is not confirmed m consecutive times at 24'.

The control described above is even suitable for configurations in which relatively great variations of the engine speed are due to parameters other than the application of the test $\Delta\theta$. These other parameters are connected with the engine, such as for example the intake of carburettor gases, or connected with the environment of the engine and the vehicle, for example the effect of wind on the vehicle or the gradient of the road etc.

However, in order to compensate the inertia of any device carrying out the method described above, and whose response time is far from negligible, an anticipation of the advance correction to be carried out is advantageously provided by varying the angle of advance in accordance with a "floating cartography".

The method described above is in this case supplemented, so as to enable a correction of the advance by the superposition of a curve of the angle of advance $\theta$ as a function of the speed N of the engine. As the engine must also be protected against the appearance of pinging, use is made of the curve of the angle of advance as a function of the speed of the engine which is obtained during use, if there is a low risk of pinging, or the advance curve at full load, if there is a high risk. This advance curve is superposed on the opeartion of the control by the periodic addition of the test $\Delta\theta$ and therefore floats at each instant of a measurement of rank t of the speed N of the engine with the point which corresponds to the instantaneous angle of advance $\theta_o$, by means of a translation along the axes of the angles of advance.

This curve of the angle of advance $\theta$ as a function of the speed N of the engine may be constituted by three rectilinear segments disposed end to end for which the slope k assumes different values, and in particular decreasing values when the speed N increases, as is shown in FIG. 6, for the first variant described above.

A second particular mode of the second variant of the method which prevents the sensitivity threshold and the response time of a device using the process in accordance with the first particular mode of the second variant described above from having a detrimental effect on the operation of this device, by means of the use of a "floating cartography" is described below with reference to the flow chart of FIG. 10.

In this second mode of this variant, the speed $N_{2t}$ (measured at 16, after the successive measurements of $N_{2(t-1)}$ at 8 and $N_{1t}$ at 12, which respectively follow the application of $\theta_o + \Delta\theta$ at 6 and $\theta_o$ at 10) is compared with a stored speed $N_3$ which is either the last speed $N_2$ for which the angle of advance has been corrected by a value $\pm\epsilon\theta$, at 26' or 32', as explained with reference to FIG. 4, and which is substituted for $N_3$ at 56 or 58, or the last speed $N_2$ substituted for $N_3$ at 60 and for which the angle of advance has been corrected as a function of the floating advance curve, in the following manner.

If the speed variation $|N_3 - N_{2t}|$, which is processed at 62, after the measurement of the speed $N_{2t}$ at 16, is greater than the speed variation $\Delta N_o$ which corresponds, for this speed $N_{2t}$, to the smallest angular resolution of the advance, whose value is, for example, 1°4, the angle of advance is corrected at 64 by the value $\pm k|N_3 - N_{2t}|$, in accordance with the sign of $N_3 - N_{2t}$, which corresponds to the direction of variation of the speed, so that the advance is modified and takes into account the curve of the "floating cartography". The latter is therefore used in all the states of the engine, except when the advance is corrected by a value $\pm\epsilon\theta$.

As the speed variation $\Delta N_o$ is generally fairly large, a correction of the angle of advance by a value $\pm k|N_3 - N_{2t}|$ may only take place after a large number of measurement cycles for the speeds $N_1$ and $N_2$. However, corrections having a value $\pm\epsilon\theta$ of the angle of advance take place after a much smaller number of measurement cycles for the speeds $N_1$ and $N_2$, such that the control which causes the corrections of value $\pm\epsilon\theta$ is predominant with respect to the control which causes the corrections of value $\pm k|N_3 - N_{2t}|$, and this predominance causes a translation of the advance curve as a function of speed, which is therefore caused to float, parallel with the axis of the angle of advance, in accordance with the corrected value $\theta_o \pm \epsilon\theta$ at the instant in question.

The inclusion of the floating curve in all the states of the engine ensures an anticipation of the advance correction, even when the speed of the engine varies with a slight slope. However, as the control which causes the corrections $\pm\epsilon\theta$ is predominant, the combinations of the various corrections obtained by superposing the two controls enables the achievement of good performances and the overall control carried out in this way has a satisfactory response time.

In certain cases, the floating cartography may be left independent of the control, for example if very short acceleration times are required. It is simply necessary to omit the blocks 56 and 58 from FIG. 10 for this purpose.

In order to prevent the control from causing the displacement of the value of the ignition angle into an angular range in which the engine begins to ping, in particular when the engine is operating at low speed and under a high load, the control method of the invention causes the ignition to be dependent on the pinging of the engine.

In accordance with the known automatic control systems of this type, the characteristic vibrations of the phenomenon of pinging of the engine are detected by means of sensors of the accelerometer type which are mounted on the cylinder head of the engine, and the level detected is compared after amplification, filtering and sutiable integration, with a weighted mean of the levels detected during previous ignitions, in order to determine whether the engine is pinging, and, if so, the ignition angle is decreased by a value which is sufficient to suppress this pinging, and then, after the disappearance of the pinging, the advance is increased processively to its initial value, in accordance with a method which may advantageously utilise several speeds and/or several levels of return of the angle of advance to its initial value.

It is generally necessary to make the self-adaptive control of the ignition advance dependent on pinging, as the optimum value of the torque is obtained in particular in the zone in which pinging of the engine takes place.

However, if it is desired to omit this automatic pinging control which, as mentioned above, comprises at least one pinging sensor and a processing network for the associated signal, displacement into the pinging zone may be prevented by displacing, with reference to the curve shown in FIG. 1, the point of operation of the engine voluntarily and systematically towards the left of the optimum value $\theta_{opt}$ on the curve which shows the torque C as a function of the angle of advance $\theta$, such that the instantaneous angle of advance $\theta$ is gradually brought towards a fictitious optimum value $\theta_f$ which is shifted outside of the zone in which pinging takes place with respect to the value $\theta_{opt}$. This is carried out by introducing a corrective term $\delta$ corresponding to this shift and such that $\theta_f$ is lower than $\theta_{opt}$, within one of the terms of the comparison of the speeds provided by the invention. For example, if $\delta > 0$, it follows that $\theta_o = \theta_f$ when the equality $2N_{1t} + \delta = N_{2t} + N_{2(t-1)}$ is present, and $\theta_o$ is corrected by the value $\epsilon\theta$ defined as above by adding or subtracting this value $\epsilon\theta$ in accordance with whether $2N_{1t} + \delta$ is lower or greater than $N_{2t} + N_{2(t-1)}$.

In addition, when the angular range $(\theta_B, \theta_H)$ in which the values $\theta_{opt}$ of the utilisation curves of the vehicle are known, it is possible to favour the direction in which the correction of the self-adaptive control described above takes place. This is achieved by modulating the number m of consecutive confirmations or verifications of an inequality with respect to this control, as described with reference to FIG. 9, on one hand as a function of the direction of variation of the instantaneous angle of advance (i.e. the number m of confirmations of an inequality is not the same depending on whether $\theta_o$ increases or decreases), and, on the other hand, that $2N_{1t}=N_{2t}+N_{2(t-1)}$, whereas in the other direction it is required that the inequality between $2N_{1t}$ and $N_{2t}+N_{2(t-1)}$ is strictly respected m consecutive times.

It is understood that any suitable modification may be made to the method described above, without departing from the scope of the invention.

I claim:

1. A method for the self-adaptive control of the angle of ignition advance of a thermal engine having positive ignition, in particular for use in a motor vehicle, in which an iterative search operation for an optimum value $\theta_{opt}$ of the angle of advance is carried out, the method comprising the steps of:
   periodically adding an angle of advance increment $\Delta\theta$ to an instantaneous angle of advance $\theta_o$,
   detecting the instantaneous speeds $N_1$ and $N_2$ of the engine corresponding to the angles of advance $\theta_o$ and $\theta_o+\Delta\theta$, respectively,
   determining the direction of variation of the speed N of the engine,
   correcting the angle of advance $\theta_o$ such that the speed variation $\Delta N$ is as low as possible, or even zero, so that the angle of advance $\theta_o$ is kept in the vicinity of its optimum value $\theta_{opt}$,
   detecting instantaneous speeds $N_1$ and $N_2$ of the engine at the end of each half-period of the iterative operation,
   selecting the duration of the half-period as a function of the speed N of the engine,
   determining the direction of variation of the speed N of the engine by comparing the speed $N_{1t}$ at the end of a half-period with no angle of advance increment $\Delta\theta$, during a measurement of rank t, with the speeds $N_{2(t-1)}$ and $N_{2t}$ at the end of half-periods with angle of advance increments $\Delta\theta$ respectively during the previous measurement of rank $t-1$ and during the measurment of rank t,
   correcting the angle of advance $\theta_o$ by respectively adding thereto or subtracting therefrom a value $\epsilon\theta\leq\Delta\theta$ if the speed $N_{1t}$ is, for a number m of comparisons between 1 and 10, respectively lower or greater than the speeds $N_{2(t-1)}$ and $N_{2t}$, in order to bring the instaantaneous angle of advance $\theta_o$ toward its optimum value $\theta_{opt}$ in a progressive manner, while avoiding correction if the speeds $N_{1t}$, $N_{2t}$ and $N_{2(t-1)}$ are substantially equal, and when the speed $N_{1t}$ lies between the speeds $N_{2(t-1)}$ and $N_{2t}$, correcting the angle of advance by superposing curve data giving the angle of advance as a function of the engine speed.

2. A method as claimed in claim 1, characterised in that:
   the speed $N_{2t}$ is compared at each instant with a stored speed $N_3$ which is either the speed $N_1$ measured just before the speed $N_{1t}$ lies between the speeds $N_{2(t-1)}$ and $N_{2t}$, or the final speed $N_2$ measured when the angle of advance is corrected by superposition of the curve of this angle as a function of the engine speed, and
   a correction of value $\pm k|N_3-N_{2t}|$ is made to this instantaneous angle of advance $\theta_o$, in accordance with the direction of variation of the speed shown by the sign of $N_3-N_{2t}$, where k is the slope of the superposed curve of the angle of advance as a function of the speed of the engine at the speed $N_{2t}$, if the speed variation $|N_3-N_{2t}|$ is greater than or equal to the value $\Delta N_o$ of the speed variation which corresponds to the smallest angular increment of advance possible at the speed $N_{2t}$.

3. A method as claimed in claim 1, characterised in that:
   the speed $N_2$ is compared at each instant with a stored speed $N_3$ which is either the last speed $N_1$ for which the instantaneous angle of advance $\theta_o$ has been corrected by a value $\pm\epsilon\theta$, or the last speed $N_2$ for which the instantaneous angle of advance $\theta_o$ has been corrected by the superposition of the curve giving this angle as a function of the engine speed, and
   a correction of value $\pm k|N_3-N_{2t}|$ is made to the angle of advance $\theta_o$, in accordance with the direction of variation of the speed given by the sign of $N_3-N_{2t}$, k being the slope of the superposed curve of the angle of advance as a function of the speed of the engine at the speed $N_{2t}$, if the speed difference $|N_3-N_{2t}|$ is greater than or equal to the value $\Delta N_o$ of the speed difference which corresponds to the smallest angular increment of advance possible at the speed $N_{2t}$.

4. A method as claimed in claim 3, characterised in that the correction of the angle of advance $\theta_o$ by the addition of a value $\{\epsilon\theta$ is predominant with respect to the correction which involves the addition of a value $\pm k|N_3-N_{2t}|$, as a result of the fairly large value given to the speed variation $\Delta N_o$ corresponding to the smallest angular resolution of the advance.

5. A method as claimed in claim 1, characterised in that the curve of the angle of advance as a function of the speed, which is obtained during normal operation of the engine is superposed if there is a low risk of pinging of the engine.

6. A method as claimed in claim 1, characterised in that the curve of the angle of advance as a function of the engine speed, which is obtained with the engine at full load is superposed if there is a high risk of pinging of the engine.

7. A method as claimed in claim 1, characterised in that it further consists in:
   detecting the vibrations due to the phenomenon of pinging of the engine,
   comparing the level of the signal detected with a weighted mean of the levels of the signals detected during the previous ignitions of the engine,
   reducing the angle of advance by a certain value each time pinging is detected, in order to suppress the latter, and
   returning the angle of advance progressively to its initial value as soon as the pinging has disappeared.

8. A method as claimed in claim 1, characterised in that it further consists in:
   bringing the instantaneous angle of advance $\theta_o$ progressively towards a fictitious optimum value $\theta_f$ which is lower than $\theta_{opt}$, and shifted with respect to the value $\theta_{opt}$ outside of the zone in which pinging takes place, by comparing $2N_{1t}+\delta$ with $N_{2t}-N_{2(t-1)}$, wherein $\delta$ is a term of correction corresponding to the shift between $\theta_{opt}$ and $\theta_f$, and increasing or reducing $\theta_o$ by the value $\epsilon\theta$ if $2N_{1t}+\delta$ is respectively greater or lower than $N_{2t}+N_{2(t-1)}$, whereas if $2N_{1t}+\delta=N_{2t}+N_{2(t-1)}$, no correction is carried out as $\theta_o=\theta_f$.

9. A method as claimed in claim 1, characterised in that it further consists in:
   modulating the value of the number m of consecutive comparisons for confirming one of the inequalities, which controls a correction by addition or subtraction of $\epsilon\theta$, as a function of the direction of variation of the instantaneous angle of advance $\theta_o$.

10. A method as claimed in claim 1, characterised in that it further consists in:
    modulating the value of the number m of consecutive confirmations of the detection of one of the inequalities, which controls a correction by addition or subtraction of $\epsilon\theta$, as a function of the angular ranges in which the angle of advance is located with respect to the limit angular values of the angle of advance $\theta_o$, such as the initial value $\theta_I$, the maximum limit value $\theta_M$ and the low and high limit values $\theta_B$ and $\theta_H$ between which the value $\theta_{opt}$ is located.

11. A method as claimed in claim 1, characterised in that in order to favour the response time of the control in one direction of variation of the instantaneous angle of advance $\theta_o$, it is assumed that the inequality which controls the correction by addition or subtraction of $\epsilon\theta$ from the angle of advance $\theta_o$ in order to vary it in this direction, is confirmed even if there is equality, whereas in the other direction of variation of the angle of advance $\theta_o$, it is necessary for the inequality to be respected m times consecutively.

12. A method for the self-adaptive control of the angle of ignition advance of a thermal engine having positive ignition, in particular for use in a motor vehicle, in which an iterative search operation for an optimum value $\theta_{opt}$ of the angle of advance is carried out, the method comprising the steps of:
    periodically adding an angle of advance increment $\Delta\theta$ to an instantaneous angle of advance $\theta_o$,
    detecting the instantaneous speeds $N_1$ and $N_2$ of the engine corresponding to the angles of advance $\theta_o$ and $\theta_o+\Delta\theta$ respectively,
    determining the direction of variation of the speed N of the engine,
    correcting the angle of advance $\theta_o$ such that the speed variation $\Delta N$ is as low as possible, or even zero, so that the angle of advance $\theta_o$ is kept in the vicinity of its optimum value $\theta_{opt}$,
    detecting instantaneous speeds $N_1$ and $N_2$ of the engine at the end of each half-period of the iterative operation,
    selecting the duration of the half-period as a function of the speed N of the engine,
    determining the direction of variation of the speed N of the engine by comparing the speed $N_{1t}$ at the end of a half-period with no angle of advance increment $\Delta\theta$, during a measurement of rank t, with the speeds $N_{2(t-1)}$ and $N_{2t}$ at the end of half-periods with angle of advance increments $\Delta\theta_o$ respectively during the previous measurement of rank $t-1$ and during the measurement of rank t,
    correcting the angle of advance $\theta_o$ by respectively subtracting therefrom or adding thereto a value $\Sigma 0$ which is lower than or equal to $\Delta\theta$ if twice the speed $N_{1t}$ is, for a number m of comparisons, between 1 and 10, respectively greater or smaller than the sum of the speeds $N_{2(t-1)}$ and $N_{2t}$, so as to bring the instantaneous angle of advance $\theta_o$ gradually towards its optimum value $\theta_{opt}$, while avoiding correction, if twice the speed $N_{1t}$ is equal to the sum of the speeds $N_{2(t-1)}$ and $N_{2t}$.

13. A method as claimed in claim 12, characterised in that the angle of advance $\theta_o$ is also corrected by superposing a curve giving the angle of advance $\theta$ as a function of the speed N of the engine on the operation of the control.

14. A method as claimed in claim 13, characterised in that:
    the speed $N_2$ is compared at each instant with a stored speed $N_3$, which is the last speed $N_2$ for which the angle of advance $\theta_o$ has been corrected by superposition of the curve giving this angle as a function of the speed of the engine, and
    a correction of value $\pm k|N_3-N_{2t}|$ is made to the angle of advance $\theta_o$ in accordance with the direction of variation of the speed shown by the sign of $N_3-N_{2t}$, k being the slope of the superposed curve of the angle of advance as a function of the speed of the engine at the speed $N_{2t}$, if the speed variation $|N_3-N_{2t}|$ is greater than or equal to the value $\Delta N_o$ of the speed variation which corresponds to the smallest angular increment of advance possible at the speed $N_{2t}$.

15. A method as claimed in claim 13, characterised in that:
    the speed $N_2$ is compared at each instant with a stored speed $N_3$, which is the last speed $N_2$ for which the instantaneous angle of advance $\theta_o$ has been corrected by a value $\pm\epsilon\theta$, and
    a correction of value $\pm k|N_3-N_{2t}|$ is made to the angle of advance $\theta_o$, in accordance with the direction of variation of the speed shown by the sign of $N_3-N_{2t}$, k being the slope of the superposed curve of the angle of advance as a function of the speed of the engine at the speed $N_{2t}$, if the speed variation $|N_3-N_{2t}|$ is greater than or equal to the value $\Delta N_o$ of the speed variation which corresponds to the smallest angular increment of advance possible at the speed $N_{2t}$.

* * * * *